(12) United States Patent
Guender et al.

(10) Patent No.: US 11,346,375 B2
(45) Date of Patent: May 31, 2022

(54) TANK, AND ELECTROHYDRAULIC COMPACT ASSEMBLY HAVING A TANK

(71) Applicant: Robert Bosch GmbH, Stuttgart (DE)

(72) Inventors: Andreas Guender, Ramsthal (DE); Jan Lukas Bierod, Bad Camberg (DE); Rebecca Lacour, Rothenbuch (DE); Mark-Patrick Muehlhausen, Aschaffenburg (DE); Carina Issinger, Aschaffenburg (DE); Ralf Maier, Neuendorf (DE); Rene Huettl, Chemnitz (DE)

(73) Assignee: Robert Bosch GmbH, Stuttgart (DE)

( * ) Notice: Subject to any disclaimer, the term of this patent is extended or adjusted under 35 U.S.C. 154(b) by 564 days.

(21) Appl. No.: 16/328,591

(22) PCT Filed: Aug. 9, 2017

(86) PCT No.: PCT/EP2017/070176
§ 371 (c)(1),
(2) Date: Feb. 26, 2019

(87) PCT Pub. No.: WO2018/041565
PCT Pub. Date: Mar. 8, 2018

(65) Prior Publication Data
US 2021/0277918 A1 Sep. 9, 2021

(30) Foreign Application Priority Data

Sep. 5, 2016 (DE) .................... 10 2016 216 698.0

(51) Int. Cl.
*B01D 19/00* (2006.01)
*F28D 1/053* (2006.01)
(Continued)

(52) U.S. Cl.
CPC ............... *F15B 1/26* (2013.01); *B01D 19/00* (2013.01); *B01D 19/0042* (2013.01);
(Continued)

(58) Field of Classification Search
CPC .... B01D 19/0042; F15B 1/26; F15B 21/0423; F15B 21/044; F28D 1/02; F28D 1/05316
See application file for complete search history.

(56) References Cited

U.S. PATENT DOCUMENTS

| | | | | |
|---|---|---|---|---|
| 580,169 | A * | 4/1897 | Washington | ....... B01D 19/0042 96/198 |
| 3,044,236 | A * | 7/1962 | Bearden | ............ B01D 19/0042 96/175 |

(Continued)

FOREIGN PATENT DOCUMENTS

| | | |
|---|---|---|
| CN | 202048052 U | 11/2011 |
| CN | 104405698 A | 3/2015 |

(Continued)

OTHER PUBLICATIONS

International Search Report corresponding to PCT Application No. PCT/EP2017/070176, dated Nov. 15, 2017 (German and English language document) (5 pages).

*Primary Examiner* — Kenneth Bomberg
*Assistant Examiner* — Matthew Wiblin
(74) *Attorney, Agent, or Firm* — Maginot, Moore & Beck LLP

(57) ABSTRACT

A tank has an annular tank space, and a separating wall for separating an inflow connection from a drain connection is provided therein. Alternatively, or in addition thereto, a partition for degassing the oil in the tank is provided. Furthermore, alternatively or in addition thereto, at least one partition for extending a flow path of the oil is provided. It is also conceivable, alternatively or in addition thereto, to arrange a cooling device in the annular space.

11 Claims, 2 Drawing Sheets

(51) Int. Cl.
*F15B 1/26* (2006.01)
*F15B 21/0423* (2019.01)
*F15B 15/18* (2006.01)
*F15B 21/044* (2019.01)
*F28D 1/02* (2006.01)

(52) U.S. Cl.
CPC ............ *F15B 15/18* (2013.01); *F15B 21/044* (2013.01); *F15B 21/0423* (2019.01); *F28D 1/02* (2013.01); *F28D 1/05316* (2013.01); *F15B 2211/20515* (2013.01); *F15B 2211/62* (2013.01)

(56) References Cited

U.S. PATENT DOCUMENTS

| | | | | |
|---|---|---|---|---|
| 4,809,745 | A | * | 3/1989 | Hormann ................ F15B 1/26 137/574 |
| 5,831,727 | A | * | 11/1998 | Stream ................ G01N 21/01 356/246 |
| 2005/0166759 | A1 | * | 8/2005 | Ross ................ B01D 19/0042 96/155 |
| 2016/0206975 | A1 | * | 7/2016 | Carl ................ B01D 19/0042 |
| 2016/0279537 | A1 | * | 9/2016 | Poon ................ B01D 19/0042 |

FOREIGN PATENT DOCUMENTS

| | | | |
|---|---|---|---|
| CN | 104747511 A | | 7/2015 |
| DE | 36 43 265 A1 | | 7/1988 |
| DE | 196 52 706 A1 | | 6/1997 |
| DE | 297 05 717 U1 | | 6/1997 |
| DE | 10 2004 038 265 B3 | | 3/2006 |
| DE | 10 2008 016 023 A1 | | 10/2009 |
| DE | 10 2015 219 078 A1 | | 4/2017 |
| DE | 10 2015 219 091 A1 | | 4/2017 |
| DE | 10 2015 219 095 A1 | | 4/2017 |
| JP | S52-119117 A | | 10/1977 |
| JP | 57103903 A | * | 6/1982 |
| JP | S57-103903 A | | 6/1982 |
| JP | 2002-141164 A | | 5/2002 |
| WO | 2017/055137 A1 | | 4/2017 |
| WO | 2017055145 | | 4/2017 |

* cited by examiner

TANK, AND ELECTROHYDRAULIC COMPACT ASSEMBLY HAVING A TANK

This application is a 35 U.S.C. § 371 National Stage Application of PCT/EP2017/070176, filed on Aug. 9, 2017, which claims the benefit of priority to Serial No. DE 10 2016 216 698.0, filed on Sep. 5, 2016 in Germany, the disclosures of which are incorporated herein by reference in their entirety.

The disclosure relates to a tank for a compact assembly and to an electrohydraulic compact assembly comprising a tank.

BACKGROUND

Electrohydraulic compact assemblies which have a hydraulic pump and which can be driven by means of an electric machine are known from the prior art. In this case, the hydraulic pump sucks oil out of a tank via a suction line and discharges oil into the tank via a return line. In the case of the known compact assemblies, it is disadvantageous that the tank conventionally has a relatively large tank volume.

SUMMARY

In contrast, the disclosure addresses the problem of providing a tank which has a relatively small tank volume. A further problem addressed by the disclosure is that of providing a compact assembly which has a relatively compact design.

The problem with respect to the tank is solved according to the features disclosed herein, and the problem with respect to the compact drive is solved according to the features described herein.

According to the disclosure, a tank is provided for a compact assembly. Said tank has an in particular approximately cylindrical outer wall. Said outer wall can encompass an in particular approximately cylindrical inner wall and, together with the inner wall, define an annular space. The annular space is preferably closed at least at the bottom thereof by an in particular annular bottom wall. An inlet connection or return connection and an outlet connection or suction connection for an oil can open out into the annular space. Advantageously, a dividing wall is provided to separate the connections so that oil can flow in particular only in a circumferential direction from the inlet connection to the outlet connection. Alternatively or additionally, it can be provided that a partition for degassing the oil is provided in particular downstream of the inlet connection in the annular space. In this case, the partition can have for example a partition opening underneath an upper edge of the partition, through which opening oil can flow. Alternatively or additionally, it can be provided that a partition extends from the outer wall or from the inner wall, or that a plurality of partitions extend in each case from the outer wall or from the inner wall, in particular approximately radially, into the annular space. Said partition or partitions is/are for example at a distance from the opposite wall. Said partition or partitions is/are then used to extend a flow path of the oil between the connections and/or to reinforce the tank. Alternatively or additionally, it can be provided that at least one cooling device through which the oil can flow or a cooling package is provided in the annular space.

This solution has the advantage that through the dividing wall, oil can flow only in one direction from the inlet connection to the outlet connection, and thus a period in which the oil is cooled and/or degassed is relatively long. In turn, this leads to a volume of the tank being able to be reduced in comparison with the prior art, which in turn can lead to a reduction in an installation space of the whole system. By the partition for degassing, the degassing of the oil is also improved, which in turn leads to a reduction in the volume of the tank. By means of the partition or partitions for extending the flow path, a period for discharging heat and for degassing can be extended with low device complexity. As a result, a reduction in the tank volume is in turn made possible. Furthermore, it is advantageous that the cooling device arranged in the annular space can cool the oil directly in the tank, which can increase the efficiency of the cooling and can thus lead in turn to a reduced tank volume. In addition, the arrangement of the cooling device in the annular space leads to an extremely compact design of the tank. The tank according to the disclosure thus advantageously leads to a reduction in the tank volume, improved tank utilization, avoids separate cooling devices which have for example coolers or heat exchangers, leads to a reduction in the installation space and prevents air bubbles from being sucked in via the suction connection, since the air bubbles are separated in the tank in a targeted manner during the degassing. In other words, a tank having a tank geometry which is optimized for degassing and cooling is made possible. This takes place in particular by optimizing a flow guide by means of at least one dividing wall in the annular tank and/or by partitions for degassing and extending the flow path between the return connection and suction connection and/or by means of a cooling device in the annular space. Furthermore, by means of the tank according to the disclosure, a power density can be increased. Moreover, it has been shown that acoustics are improved. In addition, the more compact design leads to increased robustness of the tank.

Preferably, the inlet connection is arranged adjacently to the first dividing wall side of the dividing wall, and the outlet connection is arranged adjacently to the second dividing wall side of the dividing wall in order to provide as long a flow path as possible. The dividing wall closes a flow cross section preferably completely. The dividing wall is thus preferably, in particular substantially, not flowed around by the oil at the sides, at the top or at the bottom thereof. To hold the dividing wall, grooves can be made in the inner wall and outer wall in the annular space, in which grooves the dividing wall is inserted. It would also be conceivable to provide a groove in the bottom wall. If a top wall is designed to close the annular space, then it is conceivable to also make a groove therein. Alternatively, it is conceivable to fix the dividing wall in the tank in another manner or to form said dividing wall so as to be integral with the walls at least in some portions.

In another embodiment, in the case of the partition for degassing, a flow cross section of the partition opening is advantageously selected in such a way that the flow force, in particular a resistance of at least a majority, for example more than 70%, of the air bubbles in the oil is lower than the buoyancy of said air bubbles in the oil. As a result, the air bubbles being carried along into the rest of the tank region is prevented or at least reduced, and, in the region of the for example horizontally discharging intake, the air bubbles can for example rise to an oil surface and be separated, whereby the tank volume can be reduced.

The partition for degassing preferably has a lower edge which, together with the bottom wall, the outer wall and the inner wall, can define a lower partition opening for the oil to flow through. Oil then preferably flows substantially or solely through said partition opening. The upper edge of the partition for degassing can rest or substantially rest on a top wall. To hold the partition, grooves can be made in the inner wall and the outer wall in the annular space, in which grooves the partition for degassing is inserted. In this case, the grooves can be at a distance from the bottom wall in each case to define a penetration depth of the partition in the vertical direction. By means of the grooves, it is conceivable to replace the partition with another partition which has for example a different geometric design, which overall leads to a modular system.

The partition for degassing can be provided adjacent to the inlet connection. When viewed in the circumferential direction of the tank, the inlet connection is then formed for example between the dividing wall and the partition for degassing.

To extend the flow path, at least two partitions are provided which extend for example alternately from the outer wall and the inner wall. The partitions are preferably at a distance from one another when viewed in the flow direction or in the circumferential direction of the tank. Preferably, in this case, the partitions cannot be flowed around at the top or at the bottom thereof, as a result of which preferably only a lateral edge of the partition can be flowed around. In a simple manner by means of a device, the partitions can be integrally connected to the outer wall or the inner wall. In addition, an integral connection to the bottom wall can take place. It is conceivable for the partitions to be produced together with the walls in a plastics injection molding process.

Preferably, the cooling device has a plurality of blades which are in particular at an approximately uniform distance from one another. The large sides thereof preferably extend approximately in the flow direction and/or approximately horizontally. The long sides of the blades can extend approximately in a radial direction. In another embodiment, the blades can be encompassed radially inwardly and/or radially outwardly and/or at the bottom and/or top thereof by a labyrinth seal, as a result of which the blades, which can be in the form of a set of blades, are actively permeated. In other words, by means of flow guides (labyrinth seals) which are arranged in a targeted manner, the oil flow is forced through the blades, and the oil is prevented at least to the greatest possible extent from streaming past, which leads to improved cooling of the oil.

In another embodiment, the blades can be connected to at least one heat pipe, in particular in the form of a heat siphon, in a simple manner by means of a device. As a result, in a simple manner without an external energy supply, heat can be diverted away from the blades, and thus the oil can be cooled in a simple manner by means of a device. The at least one heat pipe extends preferably approximately in the vertical direction. For improved heat dissipation, the blades are preferably formed from a thermally conductive material such as aluminum. To improve thermal conductivity between the blades and the at least one heat pipe, a heat conductor can be provided between the blades and the heat pipe. The heat conductor can be for example a solder. By means of said solder, the blades can also be rigidly connected to the at least one heat pipe in each case. For the heat pipe or a respective heat pipe, the blades each have a through-hole, which through-holes are preferably approximately aligned in the vertical direction for the heat pipe or a respective heat pipe. In another embodiment, the at least one heat pipe can be operatively connected to a heat sink which is provided in particular at the top of, in particular outside, the annular space, in particular in the form of a heat exchanger.

In another embodiment, a number and/or a spacing of the blades is selected in such a way that an accumulation takes place upstream in the normal operation of the tank. For example, the accumulation is to be approximately 30 to 40 mm. This accumulation is to occur preferably in the case of a defined volumetric flow, of for example 35 l/min, and in the case of a kinematic viscosity of approximately 30 to 50 mm/s². Preferably, the uppermost blade when viewed in the vertical direction is not flowed over in normal operation, and therefore oil flows underneath said blade in normal operation. In other words, the spacing of the blades is selected in such a way that, in the case of a tolerated accumulation in front of the set of blades, an optimal heat transfer takes place from the oil to the blades. The uppermost blade being flowed over is preferably to be eliminated in cooling operation or in normal operation in the case of the maximum defined volumetric flow mentioned by way of example (35 l/min) and the viscosity mentioned by way of example (approximately 30 to 50 mm/s²).

In another embodiment, the uppermost blade when viewed in the vertical direction is arranged underneath the upper end of the annular space or underneath the top wall. Preferably, a distance between the annular space end and the uppermost blade when viewed in the vertical direction is greater than a distance between two adjacent blades. Thus, the opening cross section delimited between the uppermost blade and the top wall can be used as a type of overflow opening. It can thus further be ensured that, for example in the case of a cold start, in which the oil can have a high viscosity, said oil does not accumulate in front of the set of blades, but rather can flow over the uppermost blade, and thus in turn it is possible to prevent the outlet connection from running dry. By flowing over the uppermost blade, a cooling function is also reduced, since less oil flows through the blades, which in the case of the cold start advantageously leads to faster heating of the oil to an optimum operating temperature of for example 40 to 50° C.

Preferably, a plurality of cooling devices, for example three, are provided in the tank. Said devices can be arranged in a row when viewed in the flow direction.

In another embodiment, the labyrinth seal can be formed by a web extending approximately in the vertical direction radially inwardly in the annular space and/or by a web extending approximately in the vertical direction radially outwardly in the annular space. In this case, the web or a respective web can have slots, a respective slot being provided to receive a blade. In another embodiment, the labyrinth seal can have a web on the bottom thereof. Said web is for example connected to the lateral web or to the lateral webs, and thus the webs form a type of frame at least in part. It is also conceivable to integrally connect the web or the webs to the corresponding wall or the corresponding walls by producing them for example in a plastics injection molding process.

Preferably, the tank can be closed at the top thereof by an end cover. In a compact manner, the end cover can be used in this case as a heat sink for the at least one heat pipe. The heat sink is for example a heat exchanger through which air and/or water can flow.

Thus, the at least one heat pipe is connected on the upper face thereof to the end cover and/or can be immersed for example in a recess in the end cover. Furthermore, it is conceivable for the end cover to be used to hold components of the compact assembly.

Preferably, a discharge opening of the outlet connection points approximately in the flow direction so that the oil can flow into the outlet connection with low flow resistance.

Furthermore, the outlet connection can be part of an outlet line which preferably extends approximately tangentially out of the annular space through the inner wall, which leads to a reduction in pressure losses of the oil flow in the tank.

The inlet connection preferably opens out into an upper region in the annular space of the tank.

According to the disclosure, an electrohydraulic compact assembly comprising a tank is provided according to one or more of the preceding aspects. Said assembly can have a hydraulic load which is encompassed in particular by the inner wall at least in some portions. The hydraulic load is for example a hydraulic machine, in particular a hydrostatic pump.

Furthermore, the compact assembly can have an electric machine, in particular an electric motor, which is arranged for example above the tank thereon. Said motor can be used to drive the load. The load can for example suck oil out of the outlet connection and convey oil into the inlet connection.

BRIEF DESCRIPTION OF THE DRAWINGS

One preferred exemplary embodiment of the disclosure will be described in greater detail below with reference to schematic drawings, in which.

DETAILED DESCRIPTION

Figure 1:
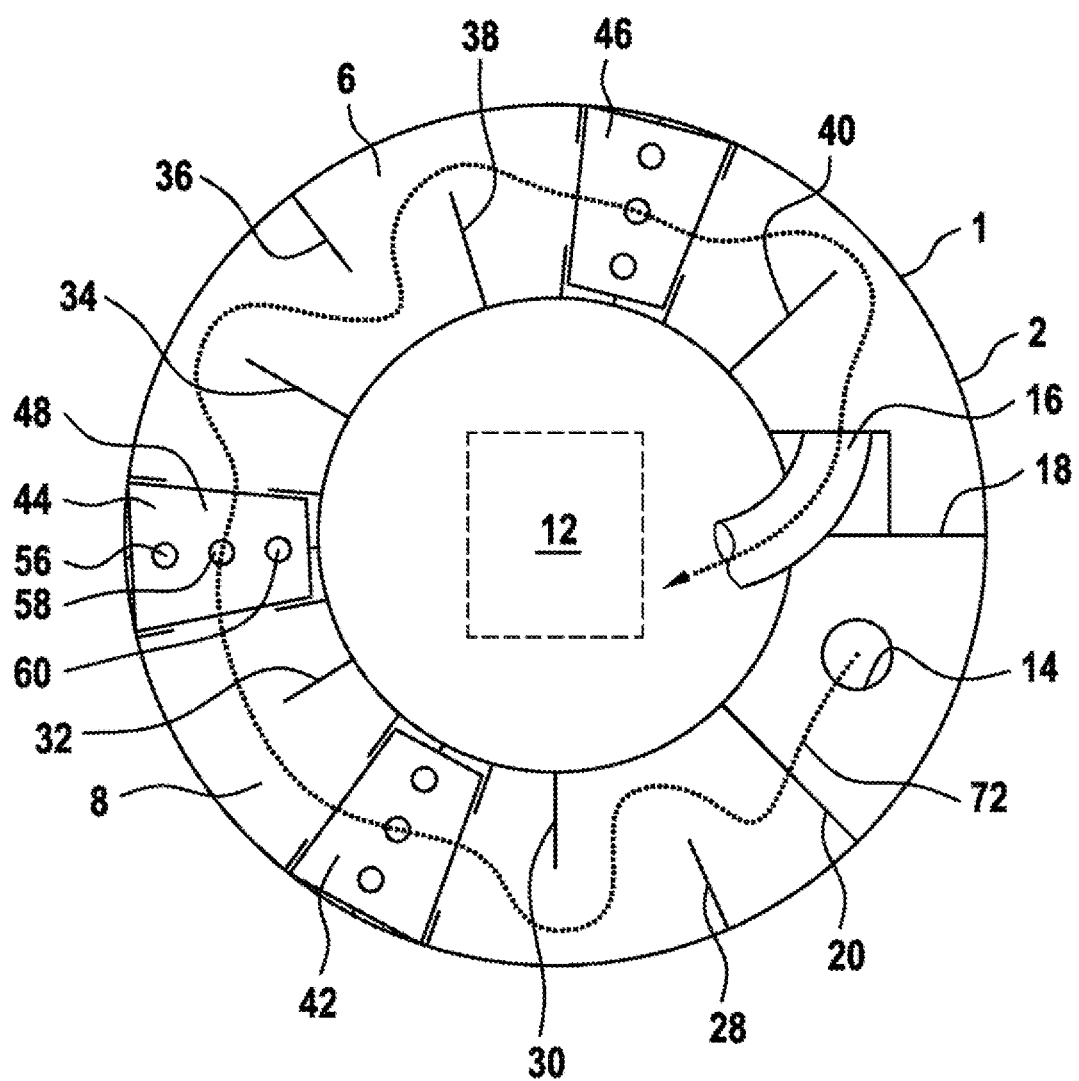
FIG. 1 is a cross-sectional view of a tank according to the disclosure.
Figure 2:
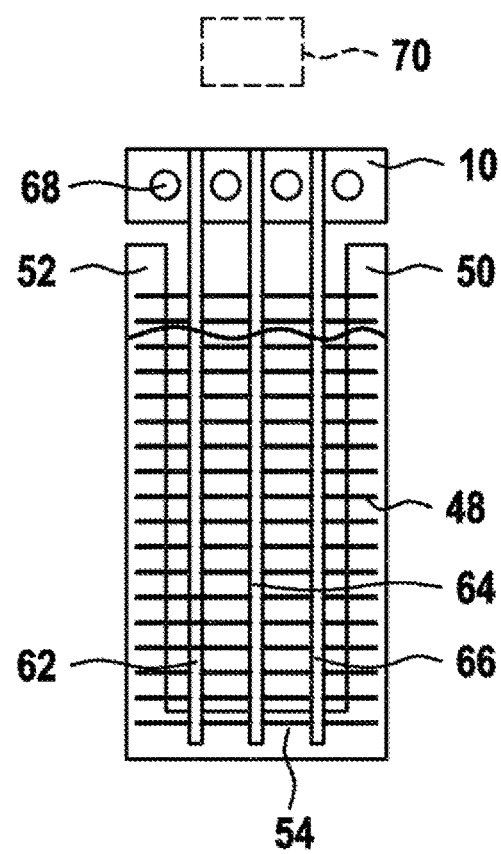
FIG. 2 is a longitudinal sectional view of a cooling device of the tank from FIG. 1.

According to FIG. 1, a tank 1 for a compact assembly has an approximately circular cylindrical outer wall 2, which encompasses an approximately circular cylindrical inner wall 4, the walls 2, 4 being arranged approximately coaxially with one another. Together, the walls 2 and 4 define an annular space 6. Said space is delimited at the bottom thereof by an annular bottom wall 8. The walls 2 and 4 extend approximately in the vertical direction, the bottom wall 8 then being arranged at the bottom when viewed in the vertical direction. At the top, the annular space 6 can be closed by a top wall (not shown), which can be formed for example by an end cover 10; see FIG. 2. In the internal space delimited by the inner wall 4 in FIG. 1, a hydraulic pump 12 can be arranged, which is schematically indicated by a dashed line according to FIG. 1. The hydraulic pump 12 can discharge oil into the annular space 6 via a load and an adjoining return connection or an inlet connection 14. Via a suction line connection or via an outlet connection 16, which is in the form of a pump inlet arranged approximately tangentially to the tank 1, the hydraulic pump 12 can then suck oil from the annular space 6.

Figure 3:
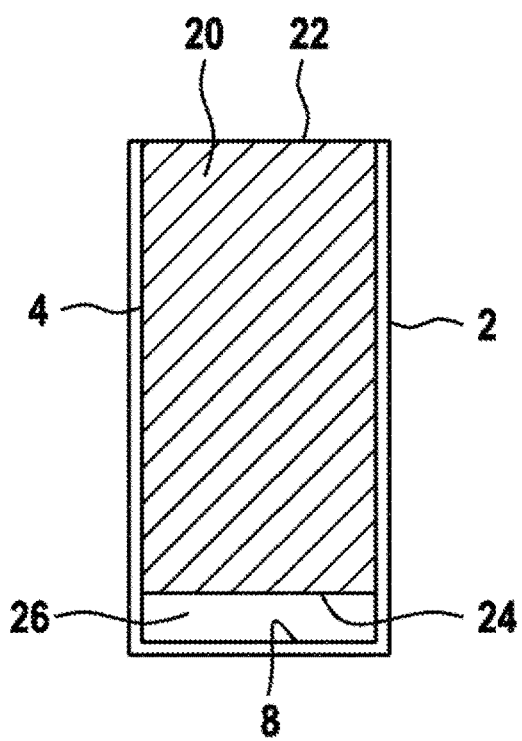
FIG. 3 is a longitudinal sectional view of a partition for degassing the tank from FIG. 1.

According to FIG. 1, a dividing wall 18 is provided which separates a return region from a suction region. Said wall extends approximately in the radial direction and vertical direction. To degas the oil flowing in the annular space 6, according to FIG. 1, a partition 20 is further provided which is shown in a cross section according to FIG. 3. The lateral edges of the partition are inserted in grooves (not shown) in the outer wall 2 and inner wall 4. In this case, an upper edge 22 of the partition 20 rests against a top wall (not shown) at least in some portions, in particular in a sealing manner. A lower edge 24 of the partition 20 is at a distance from the bottom wall 8 and thereby defines a partition opening 26.

The oil flowing in via the inlet connection 14 above the annular space 6 according to FIG. 1 is then directed to the bottom wall 8 so that said oil can continue flowing via the lower partition opening 26. By means of the partition 20 which is open at the bottom, air bubble separation is thus improved.

According to FIG. 1, additional, in particular three-dimensional, partitions 28 to 40 are provided to extend a flow path. Said partitions are alternately perforated in such a way that, with a minimal increase in the flow speed, optimum tank utilization can be ensured.

According to FIG. 1, a plurality of cooling devices 42, and 46 or cooling packages are arranged in the annular space 6 to cool the oil. In this case, the cooling device 42 is shown in a longitudinal section in FIG. 2. Said device has a plurality of blades 48, which are arranged one above the other approximately at a parallel distance, in particular at an approximately equal distance from one another. In this case, the blades 48 are received in slots in lateral webs 50 and 52. In addition, a web 54 is provided on the bottom. In this case, the webs 50 to 54 are used as labyrinth seals to reduce or prevent flow around the sides of the blades 48. According to FIG. 1, a respective blade 48 has three through-holes 56, 58 and 60 at a distance from one another. Said through-holes are arranged in a row when viewed in the radial direction. According to FIG. 2, heat pipes 62, 64 and 66 are guided through the through-holes 56 to 60, which pipes are arranged approximately at a parallel distance from one another and extend approximately in the vertical direction. In this case, the heat pipes 62 to 66 extend for example starting from the web 54 into the end cover 10. Said cover is used as a heat sink and has one or more cooling water flows 68. In addition to the hydraulic pump 12 according to FIG. 2, an electric motor 70 can also be attached to the end cover 10 on the side pointing away from the hydraulic pump 12, the electric motor being shown schematically by a dashed line.

According to FIG. 1, an oil flow runs approximately along a path 72 marked by a dashed line.

A tank having an annular tank space is disclosed. In said space, a dividing wall for separating an inlet connection from an outlet connection is provided. Alternatively or additionally, a partition for degassing the oil in the tank is provided. Furthermore, alternatively or additionally, at least one partition is provided to extend a flow path of the oil. It is also conceivable to alternatively or additionally arrange a cooling device in the annular space.

LIST OF REFERENCE NUMERALS 1 tank
2 outer wall
4 inner wall
6 annular space
8 bottom wall
10 end cover
12 hydraulic pump
14 inlet connection
16 outlet connection
18 dividing wall
20 partition for degassing
22 upper edge
24 lower edge
26 partition opening
28 to 40 partition
42 to 46 cooling device
48 blades
50 to 54 web 56 to 60 through-hole
62 to 66 heat pipe
68 cooling water flow
70 electric motor
72 path

The invention claimed is:

1. A tank for a compact assembly, comprising:
an inner wall;
an outer wall, which encompasses the inner wall and which, together with the inner wall, defines an annular space;
a bottom wall that closes a bottom of the annular space;
an inlet connection through which oil flows into the annular space;
an outlet connection through which the oil flows from the annular space; and
at least one cooling device arranged in the annular space and through which the oil flows, the at least one cooling device having a plurality of blades.

2. The tank according to claim 1, further comprising:
a first partition arranged in the annular space and configured to degas the oil, the first partition having a lower edge which, together with the bottom wall, the outer wall, and the inner wall, defines a lower partition opening through which the oil flows.

3. The tank according to claim 1, further comprising:
at least two second partitions spaced apart from one another around a circumferential direction of the annular space and extending alternately inwardly from the outer wall and outwardly from the inner wall so as to extend a length of a flow path of the oil between the inlet connection and the outlet connection.

4. The tank according to claim 1, further comprising:
a labyrinth seal encompassing the plurality of blades on at least one of a radially inwardly side, a radially outwardly side, a bottom side, and a top side.

5. The tank according to claim 4, wherein the labyrinth seal is formed by at least one of a radially inner web and a radially outer web.

6. The tank according to claim 1, wherein the plurality of blades are operatively connected to at least one heat pipe.

7. The tank according to claim 6, wherein the at least one heat pipe is operatively connected to a heat sink, which is formed by an end cover of the tank.

8. The tank according to claim 1, further comprising:
a dividing wall that separates the inlet and outlet connections,
wherein a discharge opening of the outlet connection is oriented approximately in a flow direction and/or a direction away from the dividing wall.

9. The tank according to claim 1, further comprising at least one of:
a dividing wall that separates the inlet and outlet connections;
a first partition arranged in the annular space and configured to degas the oil, the first partition defining a partition opening through which oil flows; and
at least one second partition, each second partition of the at least one second partition extending from one of the outer wall and the inner wall into the annular space so as to extend a flow path of the oil between the inlet and outlet connections and/or reinforce the tank.

10. An electrohydraulic compact assembly, comprising:
a tank comprising:
an inner wall;
an outer wall, which encompasses the inner wall and which, together with the inner wall, defines an annular space;
a bottom wall that closes a bottom of the annular space;
an inlet connection through which oil flows into the annular space;
an outlet connection through which the oil flows from the annular space; and
at least one cooling device arranged in the annular space and through which the oil flows, the at least one cooling device having a plurality of blades;
a hydraulic load; and
an electric machine configured to drive the hydraulic load,
wherein the electrohydraulic compact assembly is configured such that the hydraulic load sucks oil out of the outlet connection and conveys the oil into the inlet connection.

11. The electrohydraulic compact assembly according to claim 10, wherein the tank further comprises at least one of:
a dividing wall that separates the inlet and outlet connections;
a first partition arranged in the annular space and configured to degas the oil, the first partition defining a partition opening through which oil flows; and
at least one second partition, each second partition of the at least one second partition extending from one of the outer wall and the inner wall into the annular space so as to extend a flow path of the oil between the inlet and outlet connections and/or reinforce the tank.

* * * * *